US00RE43396E

(19) United States
(12) Reissued Patent
Nielsen

(10) Patent Number: US RE43,396 E
(45) Date of Reissued Patent: May 22, 2012

(54) MULTIMEDIA SYSTEM CONTROLLER TRAY

(75) Inventor: Britta Claire Nielsen, Bellevue, WA (US)

(73) Assignee: Whalen Furniture Manufacturing, Inc., San Diego, CA (US)

(21) Appl. No.: 29/386,461

(22) Filed: Mar. 1, 2011

Related U.S. Patent Documents

Reissue of:
(64) Patent No.: Des. 596,886
Issued: Jul. 28, 2009
Appl. No.: 29/336,696
Filed: May 7, 2009

(51) LOC (9) Cl. ..... 06-02
(52) U.S. Cl. ..... D6/510
(58) Field of Classification Search ..... D6/510; 206/373, 562, 563, 214, 371; D19/65, 75, D19/77–78, 81, 83, 86, 91–92, 95, 99, 100; 211/69.1, 69.9, 10–11, 13.1, 45, 50
See application file for complete search history.

(56) References Cited

U.S. PATENT DOCUMENTS

| | | | | | |
|---|---|---|---|---|---|
| D292,220 | S | * | 10/1987 | Wen | D19/92 |
| D357,034 | S | * | 4/1995 | King | D19/77 |
| D397,274 | S | * | 8/1998 | Hise | D7/637 |
| D422,141 | S | * | 4/2000 | Dembicks | D3/313 |
| D446,063 | S | * | 8/2001 | Quinn | D6/510 |
| D455,921 | S | * | 4/2002 | Quinn | D6/510 |
| D472,711 | S | * | 4/2003 | Chen | D3/313 |
| D490,259 | S | * | 5/2004 | Schumann et al. | D6/510 |
| D537,633 | S | * | 3/2007 | Marnell, II | D3/313 |
| D545,500 | S | * | 6/2007 | McCambridge | D28/74 |
| D547,973 | S | * | 8/2007 | Brown et al. | D6/476 |
| D563,673 | S | * | 3/2008 | Dretzka | D3/304 |
| D579,698 | S | * | 11/2008 | Nielsen | D6/510 |
| D583,599 | S | * | 12/2008 | Nielsen | D6/510 |
| D584,083 | S | * | 1/2009 | Nielsen | D6/510 |
| D590,596 | S | * | 4/2009 | Dretzka | D3/304 |
| D622,532 | S | * | 8/2010 | Moore | D6/629 |
| D628,825 | S | * | 12/2010 | Nielsen | D6/407 |
| D628,826 | S | * | 12/2010 | Kohler | D6/407 |
| D628,827 | S | * | 12/2010 | Nielsen | D6/407 |
| D634,943 | S | * | 3/2011 | Nielsen | D6/407 |
| 2003/0006156 | A1 | * | 1/2003 | McCracken et al. | 206/373 |
| 2004/0245254 | A1 | * | 12/2004 | Rosenberg et al. | 220/507 |

* cited by examiner

*Primary Examiner* — Kelley Donnelly
(74) *Attorney, Agent, or Firm* — Barlow, Josephs & Holmes, Ltd.

(57) CLAIM

An ornamental design for the multimedia system controller tray, as shown and described.

DESCRIPTION

FIG. 1 is a first perspective view of a design for the multimedia system controller tray;
FIG. 2 is a second perspective view of the design therefor;
FIG. 3 is a first end view of the design therefor;
FIG. 4 is a second end view of the design therefor;
FIG. 5 is a side view of the design therefor mirrored on the opposing side;
FIG. 6 is a top plan view of the design therefor; and,
FIG. 7 is a bottom plan view of the design therefor.
The dashed lines in the drawings are shown for environmental purposes and form no part of the claimed design.

1 Claim, 6 Drawing Sheets

Figure 1:
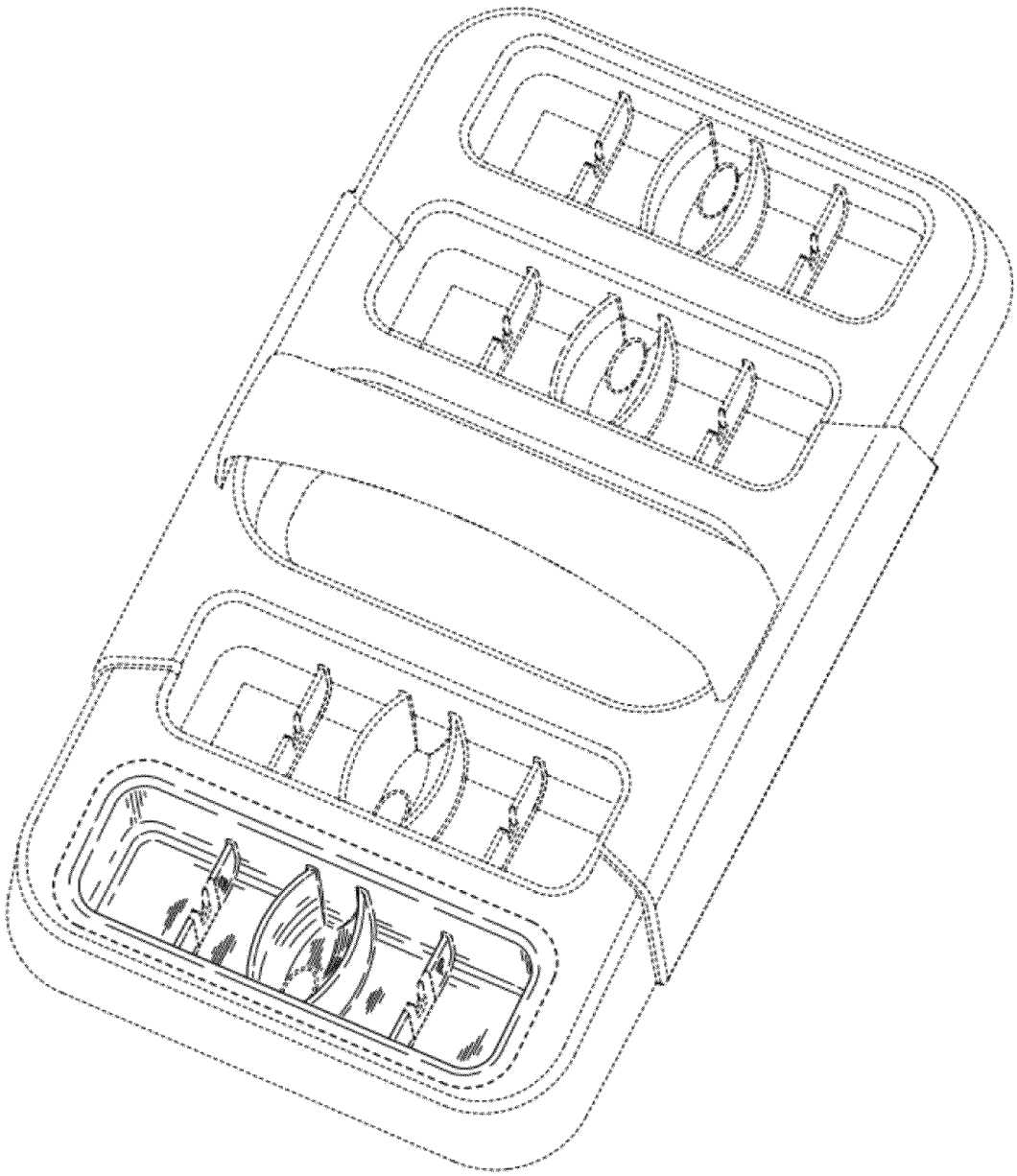
Figure 2:
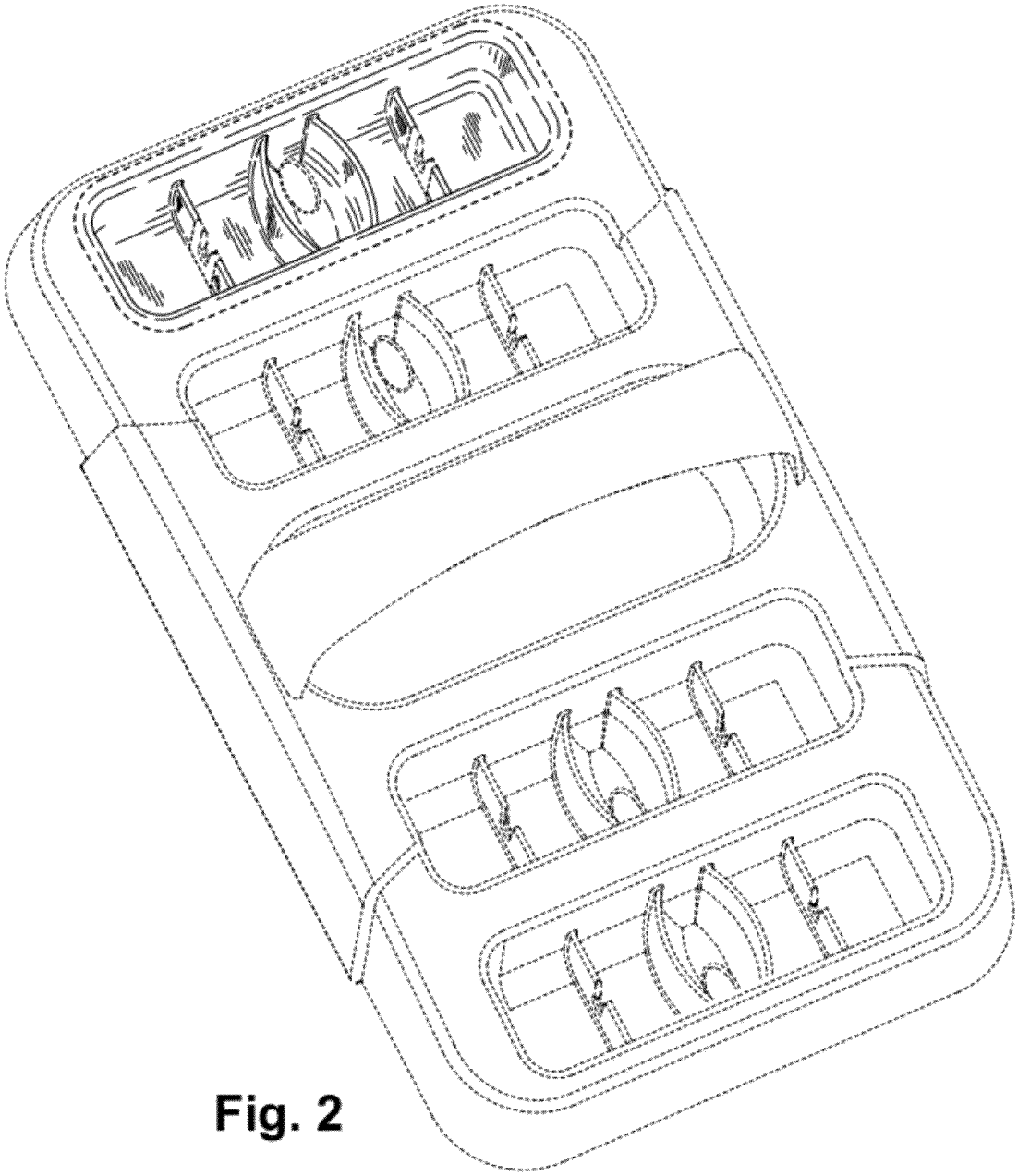
Figure 3:
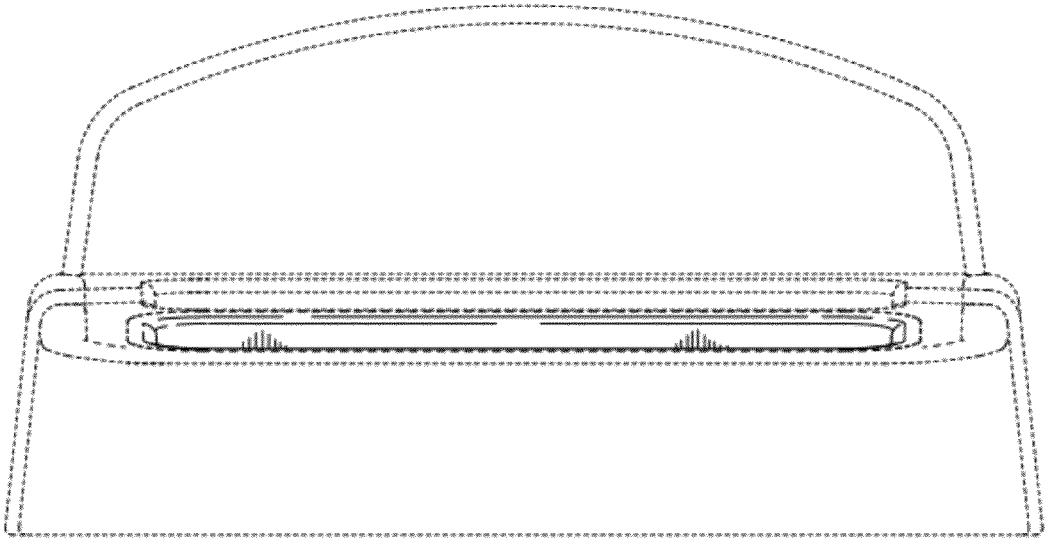
Figure 4:
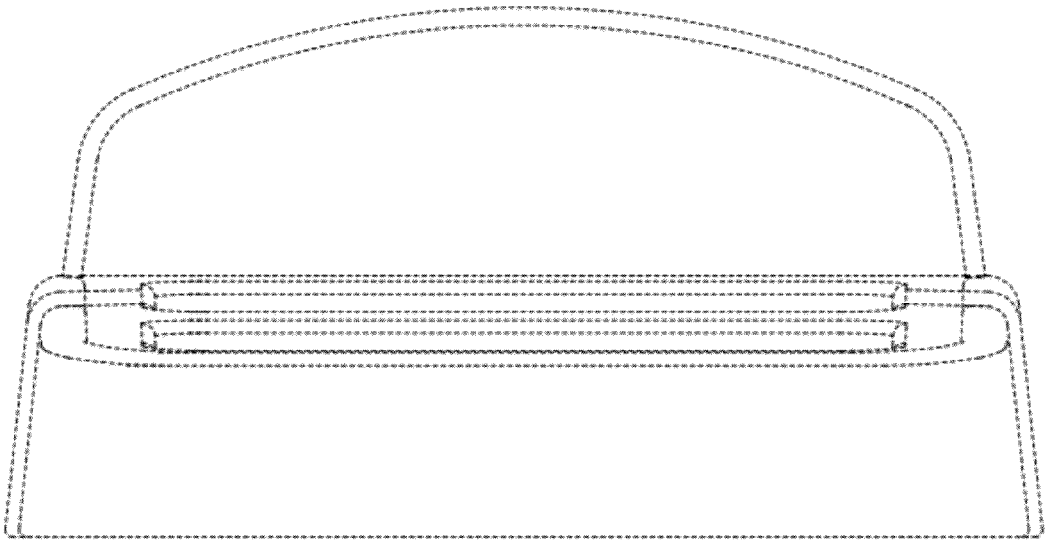
Figure 5:
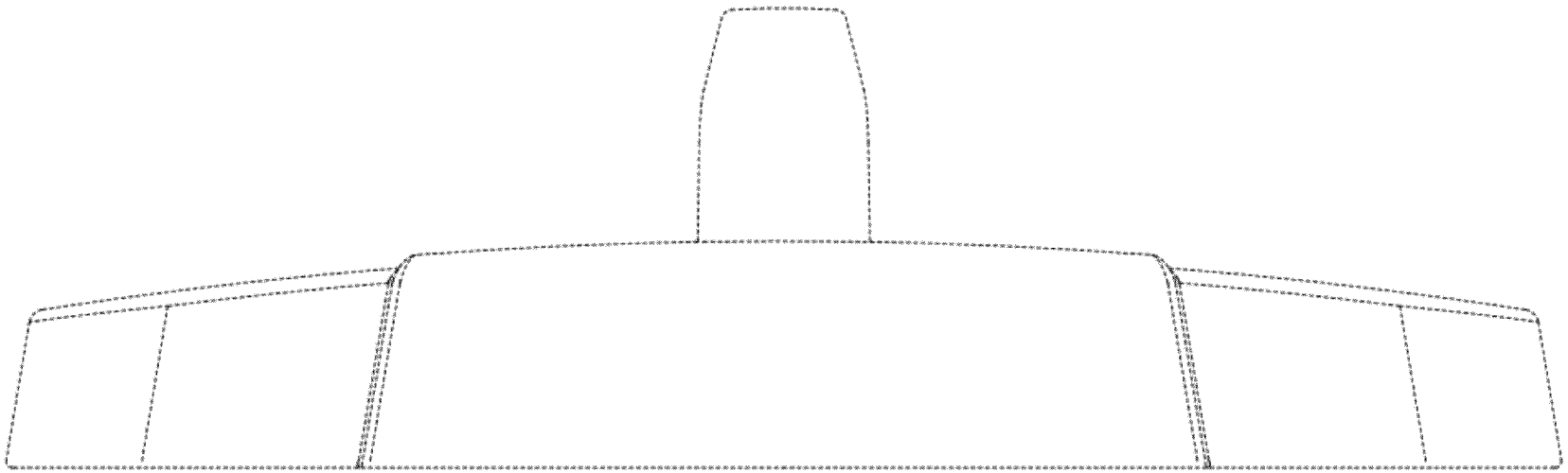
Figure 6:
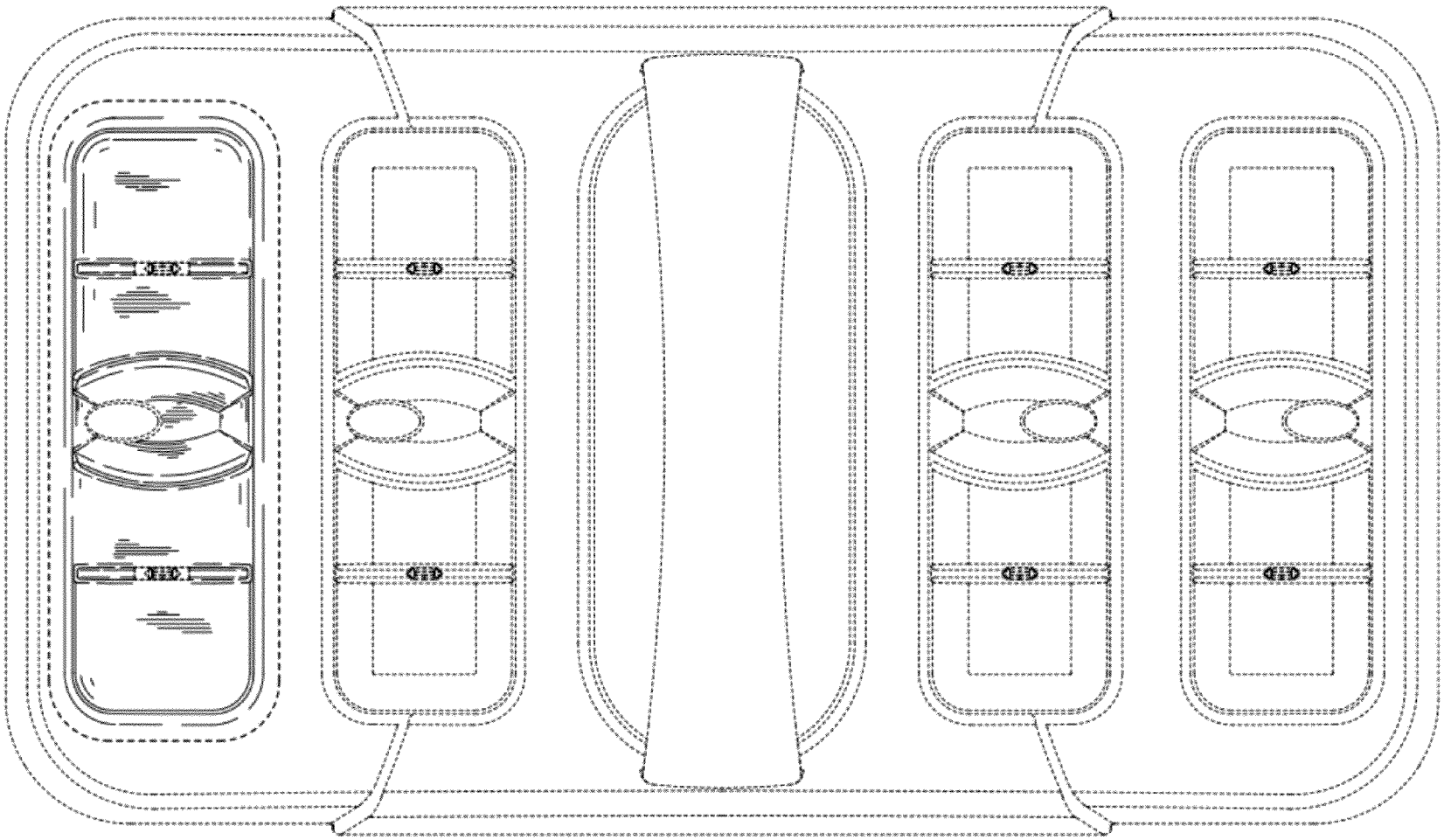
Figure 7:
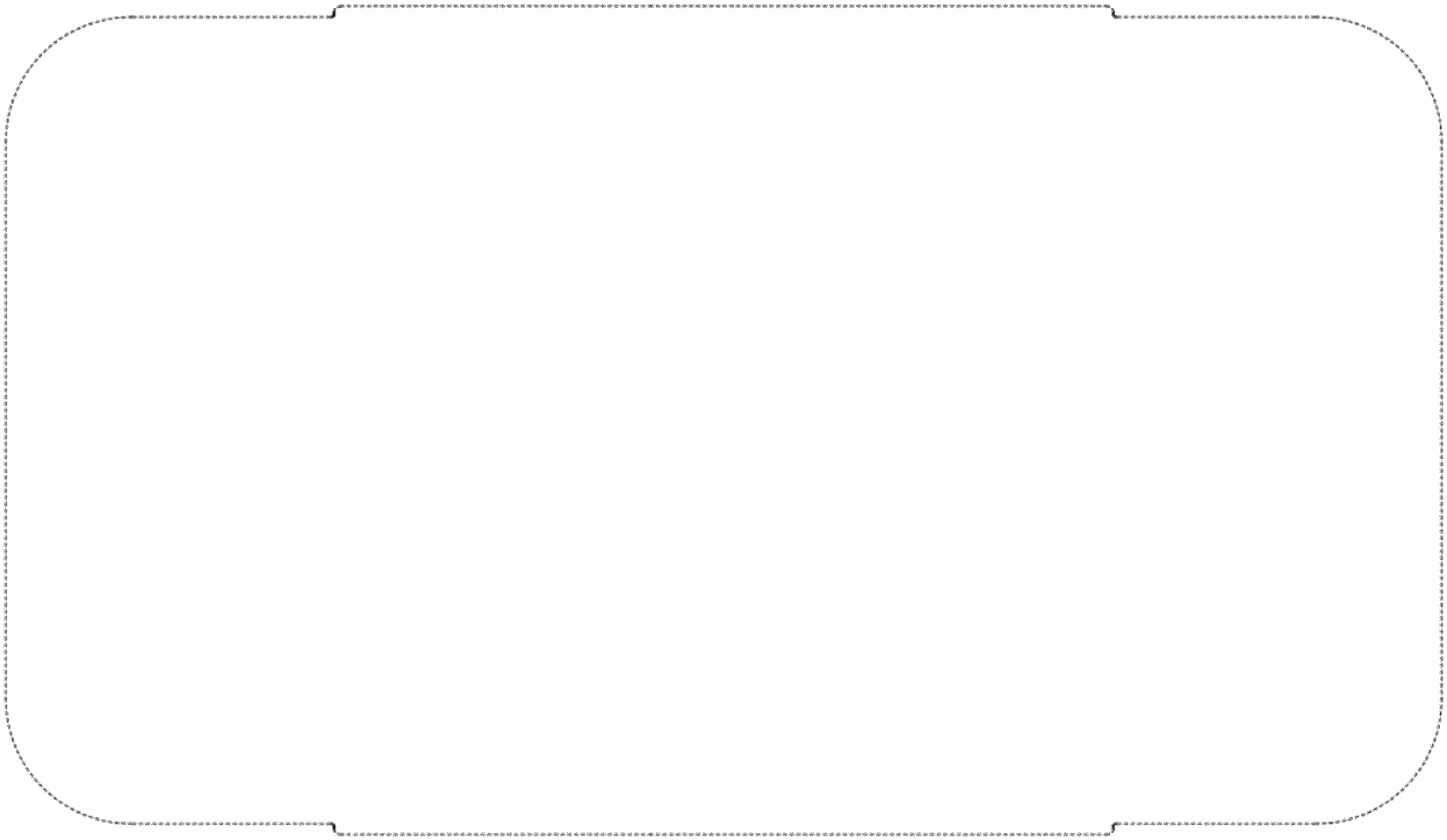

Matter enclosed in heavy brackets [ ] appears in the original patent but forms no part of this reissue; matter printed in italics indicates the additions made by reissue.

Amended

Amended

Amended

Amended

Amended

Amended

Amended